United States Patent
Christmas

(10) Patent No.: US 11,307,534 B2
(45) Date of Patent: Apr. 19, 2022

(54) HOLOGRAPHIC PROJECTOR

(71) Applicant: DUALITAS LTD., Buckinghamshire (GB)

(72) Inventor: Jamieson Christmas, Buckinghamshire (GB)

(73) Assignee: DUALITAS LTD, Milton Keynes (GB)

( * ) Notice: Subject to any disclaimer, the term of this patent is extended or adjusted under 35 U.S.C. 154(b) by 209 days.

(21) Appl. No.: 16/603,531

(22) PCT Filed: Oct. 27, 2017

(86) PCT No.: PCT/GB2017/053238
§ 371 (c)(1),
(2) Date: Oct. 7, 2019

(87) PCT Pub. No.: WO2018/185447
PCT Pub. Date: Oct. 11, 2018

(65) Prior Publication Data
US 2020/0033803 A1    Jan. 30, 2020

(30) Foreign Application Priority Data

Apr. 7, 2017 (GB) ...................................... 1705630

(51) Int. Cl.
*G03H 1/22* (2006.01)

(52) U.S. Cl.
CPC ......... *G03H 1/2294* (2013.01); *G03H 1/2205* (2013.01); *G03H 2001/2215* (2013.01); *G03H 2001/2231* (2013.01); *G03H 2225/22* (2013.01)

(58) Field of Classification Search
None
See application file for complete search history.

(56) References Cited

U.S. PATENT DOCUMENTS

| 2013/0100510 A1 | 4/2013 | Lee et al. |
| 2016/0004219 A1 | 1/2016 | Leister et al. |

(Continued)

FOREIGN PATENT DOCUMENTS

| EP | 0451681 | 10/1991 |
| EP | 3101468 A1 | 12/2016 |

(Continued)

OTHER PUBLICATIONS

The International Search Report (ISR) with Written Opinion for PCT/GB2017/053238 dated Jan. 17, 2018, pp. 1-19.

(Continued)

*Primary Examiner* — Jennifer D. Carruth
(74) *Attorney, Agent, or Firm* — McDonnell Boehnen Hulbert & Berghoff LLP

(57) ABSTRACT

There is provided a holographic projection system arranged to project light to a rectangular replay field. The holographic projection system comprises: a spatial light modulator, comprising an array of pixels, arranged to receive a computer-generated hologram and output spatially-modulated light forming a holographic reconstruction at the rectangular replay field, wherein each pixel is rectangular; and a light source arranged to illuminate the plurality of pixels to form the spatially-modulated light forming a holographic reconstruction at the replay field, wherein the rectangular replay field is spatially separated from the spatial light modulator and the aspect ratio of the rectangular replay field is substantially equal to the aspect ratio of each pixel but orthogonally orientated.

19 Claims, 9 Drawing Sheets

(56) References Cited

U.S. PATENT DOCUMENTS

2016/0077339 A1    3/2016  Christmas
2016/0349702 A1   12/2016  Sung
2019/0094803 A1*   3/2019  Futterer ............. G02B 27/0944

FOREIGN PATENT DOCUMENTS

| | | |
|---|---|---|
| GB | 2438472 | 11/2007 |
| GB | 2454246 A | 5/2009 |
| GB | 2498170 | 10/2013 |
| GB | 2501112 | 10/2013 |
| GB | 2509180 | 6/2014 |
| GB | 2518664 | 4/2015 |
| GB | 2526159 | 11/2015 |
| JP | H09138631 A | 5/1997 |
| KR | 20140076284 A | 6/2014 |
| WO | 2005059881 A2 | 6/2005 |

OTHER PUBLICATIONS

Verrier, N et al. "Off-axis digital hologram reconstruction: some practical considerations" Applied Optics (2011), pp. 1-14.
United Kingdom Examination Report for GB1705630.0 dated Jun. 6, 2019, pp. 1-4.
United Kingdom Examination Report for GB1705630.0 dated Jun. 8, 2019, pp. 1-2.
United Kingdom Examination Report for GB1705630.0 dated Feb. 12, 2019, pp. 1-3.
United Kingdom First Examination Report for GB1705630.0 dated Sep. 29, 2017, p. 1.
M. Bernau & Ruediger Kays, "Diffraction-Based Laser Projection Using Liquid Crystal Displays," 14th Conference on Electronic Media Technology (2011).

* cited by examiner

HOLOGRAPHIC PROJECTOR

CROSS-REFERENCE TO RELATED APPLICATION

This application is a U.S. national phase application of International Application No. PCT/GB2017/053238, filed on Oct. 27, 2018, which claims priority to United Kingdom Patent Application No. 1705630.0, filed Apr. 7, 2017.

FIELD

The present disclosure relates to a spatial light modulator and a projector. More specifically, the present disclosure relates to a holographic projection system, a method fabricating a spatial light modulator and a method of operating a spatial light modulator for holographic projection. Some embodiments relate to a projector for projecting light to or within a rectangular replay field and a method of maximising the resolution of image pixels in a holographic replay field having a rectangular shape. Some embodiments relate to a head-up display and a head-mounted display.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms, respectively. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may instead be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

There is disclosed herein an improved holographic projection system.

SUMMARY

Aspects of the present disclosure are defined in the appended independent claims.

There is provided a holographic projection system arranged to project light to a rectangular replay field. The holographic projection system comprises a spatial light modulator and light source. The spatial light modulator, comprises an array of pixels, arranged to receive a computer-generated hologram and output spatially-modulated light forming a holographic reconstruction at the replay field. Each pixel is rectangular. The light source is arranged to illuminate the plurality of pixels to form the spatially-modulated light forming a holographic reconstruction at the replay field. The replay field is spatially separated from the spatial light modulator. The aspect ratio of the replay field is substantially equal to the aspect ratio of each pixel but orthogonally orientated. That is, the replay field and each pixel are orthogonally orientated with respect to each other. It may be said that the aspect ratio of the replay field is the inverse of the aspect ratio of each pixel or it may be said that the long and short axis are interchanged between the replay field and each pixels.

Notably, the long axis of the replay field is substantially perpendicular to the long axis of the pixels. It may therefore be said that the replay field is orthogonal to the pixels or orthogonally configured with respect to the pixels or orthogonally orientated with respect to the pixels. In other words, the long axis of the rectangle delimiting the replay field is perpendicular to the long axis of a rectangle delimiting a pixel.

There is also provided a spatial light modulator for holographic projection. The spatial light modulator comprises an array of rectangular pixels, arranged to receive a computer-generated hologram and output spatially-modulated light forming a holographic reconstruction at the replay field.

There is further provided a liquid crystal on silicon spatial light modulator for holographic projection. The spatial light modulator comprises an array of rectangular pixels, arranged to receive a phase-only computer-generated hologram and output spatially-modulated light forming a holographic reconstruction at the replay field.

There is provided a liquid crystal on silicon spatial light modulator comprising an array of rectangular pixels. There is also provided a spatial light modulator comprising an array of elliptical or otherwise elongate pixels.

The pixels of the spatial light modulator may be referred to as "hologram pixels". In accordance with the present disclosure, the hologram pixels are rectangular so that a rectangular replay field is provided with maximum resolution (density) of "image pixels", wherein image pixels are the smallest resolvable elements in the holographic reconstruction (image). Again, the hologram pixels and replay field are orthogonally configured/orientated.

Embodiments of the present disclosure relate to holographic projector. A distinction is made with conventional display in which a meaningful image may be observed directly on an array of pixels. In embodiments, a computer-generated hologram is displayed on the array of pixels of the spatial light modulator. In embodiments, the hologram is a mathematical transform—such as a Fourier transform—of a meaningful image. In embodiments, the holographic reconstruction is formed by interference of the spatially-modulated light at the replay field. In embodiments, the spatially-modulated light is diffracted by the pixels of the spatial light modulator. In embodiments, a holographic reconstruction (which, for short-hand, may be referred to as an "image") is projected onto a light-receiving surface, such as a screen or diffuser, which is spatially-separated, or spatially-remote, from the spatial light modulator.

The inventor has recognised that, owing to the complex holographic process, if the shape of the smallest feature in the hologram plane is tuned to the shape of the largest feature in the reconstruction/image plane, maximum resolution in the reconstruction/image plane is achieved. Specifically, for maximum resolution in the reconstruction/image plane, the shape of the pixels of the spatial light modulator should be as closely matched to the shape of the required replay field as possible. If the shape of the hologram pixels is exactly matched in aspect ratio to that of the replay field, all image pixels may be utilised for display. In conventional display, the shape of the pixels on the display device does not determine the full spatial extent of the replay field/image plane. In contrast to conventional display technology, embodiments relate to a holographic projector in which image formation relies on diffraction. The teachings of conventional display technology are therefore of limited relevance to the present disclosure in which the fundamental physics of image formation is different.

Furthermore, in embodiments fundamentally distinct from other display technologies, the computer-generated hologram is a mathematical transformation of the holographic reconstruction. The computer-generated hologram may be a Fourier transform (or simply, Fourier) hologram or a Fresnel transform hologram. The computer-generated hologram may alternatively be calculated by a point cloud method.

In some embodiments, the spatial light modulator is a phase-only spatial light modulator. These embodiments are advantageous because no optical energy is lost by modulating amplitude. Accordingly, an efficient holographic projection system is provided. However, the present disclosure may be equally implemented on an amplitude-only spatial light modulator or an amplitude and phase modulator. It may be understood that the hologram will be correspondingly phase-only, amplitude-only or fully-complex.

The hologram pixels are arranged in a regular array. The pixels are rectangular and the long side of the pixels are substantially parallel. In embodiment, the pixel pitch in one direction of the array is different to the pixel pitch in the other direction of the array. In some embodiments, the pixels are as closely packed as possible to minimise the interpixel space which gives rise to an unwanted specular reflection.

In further advantageous embodiments, the rectangular pixels are arranged in a square array or circular array. The inventor has further recognised that, owing to the complex holographic process, the shape of the largest feature in the hologram plane may be used to tune the shape of the image pixels. Specifically, the array of active pixels used for displaying the hologram defines an aperture and the shape of this aperture may be used to optimise the image pixels for improved image quality. An aperture on the spatial light modulator delineates the contiguous group of active pixels.

In other advantageous embodiments, each hologram pixel comprises liquid crystal and the n-directors of the liquid crystals are aligned, for example by rubbing, in the long direction of the rectangular pixels. That is, the directors are substantially parallel to the long side of the pixels. Advantageously, by aligning the directors with the long side, the effect of the major switching fringe fields within the array is minimised. This is because the major liquid crystal switching occurs in the longest direction of the pixel. Therefore, liquid crystal disclinations—that is, defects in the orientation of the liquid crystals—are minimised.

There is also provided a method of maximising the resolution of image pixels in a holographic replay field having a rectangular shape. The method comprises receiving a computer-generated hologram. The method then comprises representing the computer-generated hologram on a spatial light modulator comprising a plurality of hologram pixels. The hologram pixels are rectangular. The method then comprises spatially-modulating light in accordance with the computer-generated hologram. The method finally comprises forming a holographic reconstruction at the holographic replay field. The holographic replay field is spatially separated from the spatial light modulator. The aspect ratio of the replay field is substantially inverse to the aspect ratio of each hologram pixel.

There is also provided a method of operating a spatial light modulator comprising spatially-modulating light in accordance with a computer-generated hologram displayed on the spatial light modulator and forming a holographic reconstruction at a holographic replay field.

There is further provided a method of fabricating a liquid crystal on silicon device comprising forming an array of rectangular pixels (or rectangular cells) containing liquid crystal and aligning the liquid crystal directors in the direction of the long axis (or long side) of the pixels. The step of aligning may be performed by or performed using an alignment layer and the method of fabricating the liquid crystal on silicon device may further comprise processing the alignment layer to impart an alignment property or alignment characteristic. It may be said that the step of processing the alignment layer imparts directionality to the alignment layer. The alignment property or alignment characteristic of the alignment layer may be physical or topological. The step of imparting an alignment property to the alignment layer may comprise at least one selected from the group comprising: physical rubbing, directional evaporation or photoalignment. The alignment property may be imparted to the alignment layer before or after the liquid crystal is inserted or deposited into the cell. The alignment layer may be in physical contact with the liquid crystal. The alignment property of the alignment layer, in turn, imparts alignment to the liquid crystal directors. The alignment layer therefore has directionality parallel to the long side of the rectangular pixels.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

The term "hologram" is used to refer to the recording which contains amplitude and/or phase information about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values.

The term "light" is used herein in its broadest sense. Some embodiments are equally applicable to visible light, infrared light and ultraviolet light, and any combination thereof.

It will be appreciated that reference to "rectangles" and "rectangular" throughout allows for some tolerance in the exact shape. The word "rectangular" may be read as "substantially rectangular".

Some embodiments describe 1D and 2D holographic reconstructions by way of example only. In other embodiments, the holographic reconstruction is a 3D holographic reconstruction. That is, in some embodiments, each computer-generated hologram forms a 3D holographic reconstruction.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

It has been found that a holographic reconstruction of acceptable quality can be formed from a "hologram" containing only phase information related to the original object. Such a holographic recording may be referred to as a phase-only hologram. Some embodiments relate to phase-only holography by way of example only. That is, in some embodiments, the spatial light modulator applies only a phase-delay distribution to incident light. In some embodiments, the phase delay applied by each pixel is multi-level. That is, each pixel may be set at one of a discrete number of phase levels. The discrete number of phase levels may be selected from a much larger set of phase levels or "palette".

Figure 1:
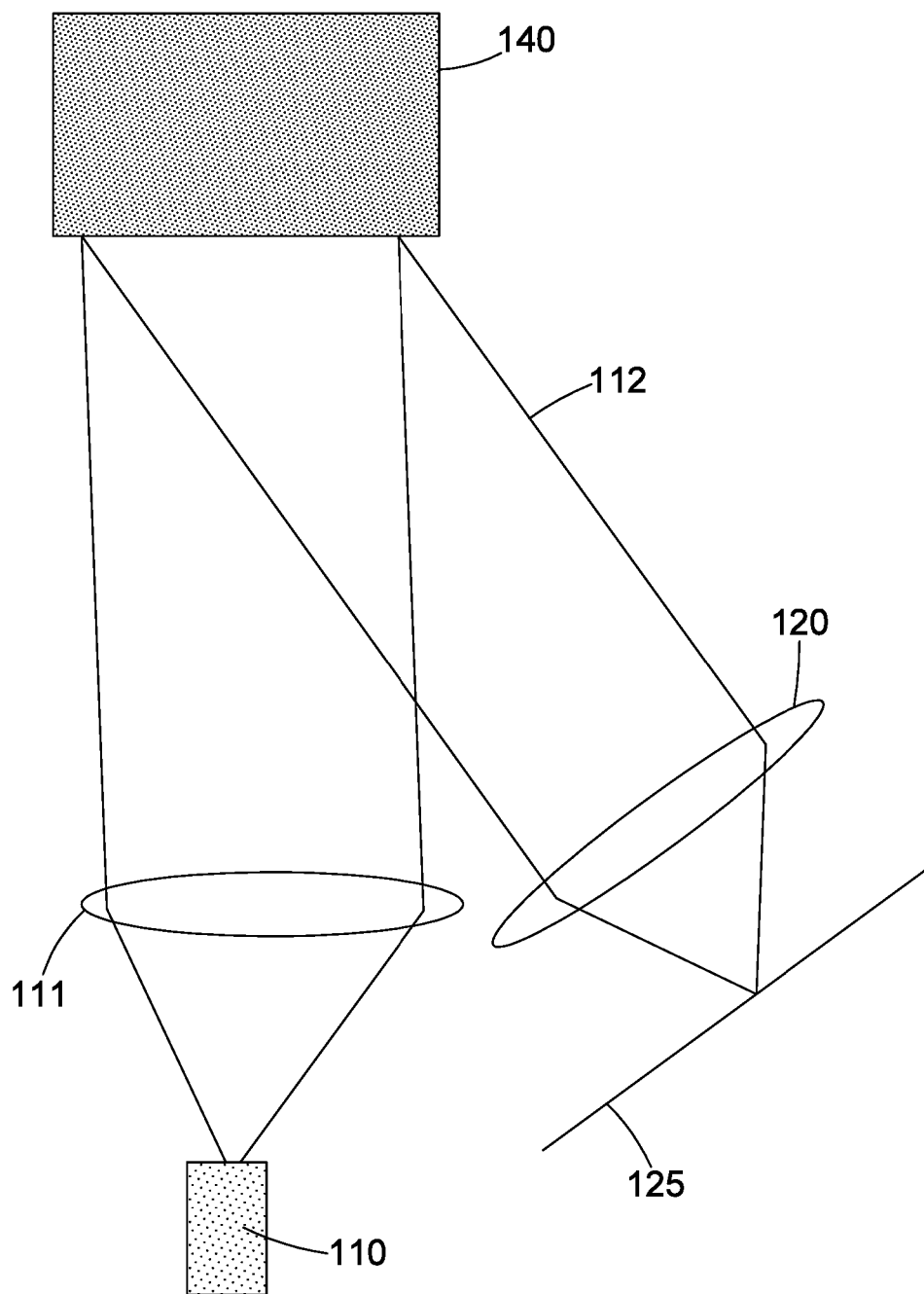
FIG. 1 is a schematic showing a reflective SLM producing a holographic reconstruction on a screen.

In some embodiments, the computer-generated hologram is a Fourier transform of the object for reconstruction. In these embodiments, it may be said that the hologram is a Fourier domain or frequency domain representation of the object. FIG. 1 shows an embodiment using a reflective SLM to display a phase-only Fourier hologram and produce a holographic reconstruction at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. The direction of the wavefront is off-normal (e.g. two or three degrees away from being truly orthogonal to the plane of the transparent layer). In other embodiments, the generally planar wavefront is provided at normal incidence using a beam splitter, for example. In the example shown in FIG. 1, the arrangement is such that light from the light source is reflected off a mirrored rear surface of the SLM and interacts with a phase-modulating layer to form an exit wavefront 112. The exit wavefront 112 is applied to optics including a Fourier transform lens 120, having its focus at a screen 125.

The Fourier transform lens 120 receives a beam of phase-modulated light from the SLM and performs a frequency-space transformation to produce a holographic reconstruction at the screen 125.

Light is incident across the phase-modulating layer (i.e. the array of phase modulating elements) of the SLM. Modulated light exiting the phase-modulating layer is distributed across the replay field. Notably, in this type of holography, each pixel of the hologram contributes to the whole reconstruction. That is, there is not a one-to-one correlation between specific points on the replay field and specific phase-modulating elements.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. However, in other embodiments, the Fourier transform is performed computationally by including lensing data in the holographic data. That is, the hologram includes data representative of a lens as well as data representing the object. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated hologram how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

A Fourier hologram of a 2D image may be calculated in a number of ways, including using algorithms such as the Gerchberg-Saxton algorithm. The Gerchberg-Saxton algorithm may be used to derive phase information in the Fourier domain from amplitude information in the spatial domain (such as a 2D image). That is, phase information related to the object may be "retrieved" from intensity, or amplitude, only information in the spatial domain. Accordingly, a phase-only Fourier transform of the object may be calculated.

In some embodiments, a computer-generated hologram is calculated from amplitude information using the Gerchberg-Saxton algorithm or a variation thereof. The Gerchberg Saxton algorithm considers the phase retrieval problem when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process.

The Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral) domain. The spatial and spectral constraints are $I_A(x, y)$ and $I_B(x, y)$ respectively. The constraints in either the spatial or spectral domain are imposed upon the amplitude of the data set. The corresponding phase information is retrieved through a series of iterations.

In some embodiments, the hologram is calculated using an algorithm based on the Gerchberg-Saxton algorithm such as described in British patent 2,498,170 or 2,501,112 which are hereby incorporated in their entirety by reference.

In accordance with some embodiments, an algorithm based on the Gerchberg-Saxton algorithm retrieves the phase information $\psi[u, v]$ of the Fourier transform of the data set which gives rise to a known amplitude information $T[x, y]$. Amplitude information $T[x, y]$ is representative of a target image (e.g. a photograph). The phase information $\psi[u, v]$ is used to produce a holographic representative of the target image at an image plane.

Since the magnitude and phase are intrinsically combined in the Fourier transform, the transformed magnitude (as well as phase) contains useful information about the accuracy of the calculated data set. Thus, the algorithm may provide feedback on both the amplitude and the phase information.

Figure 2A:
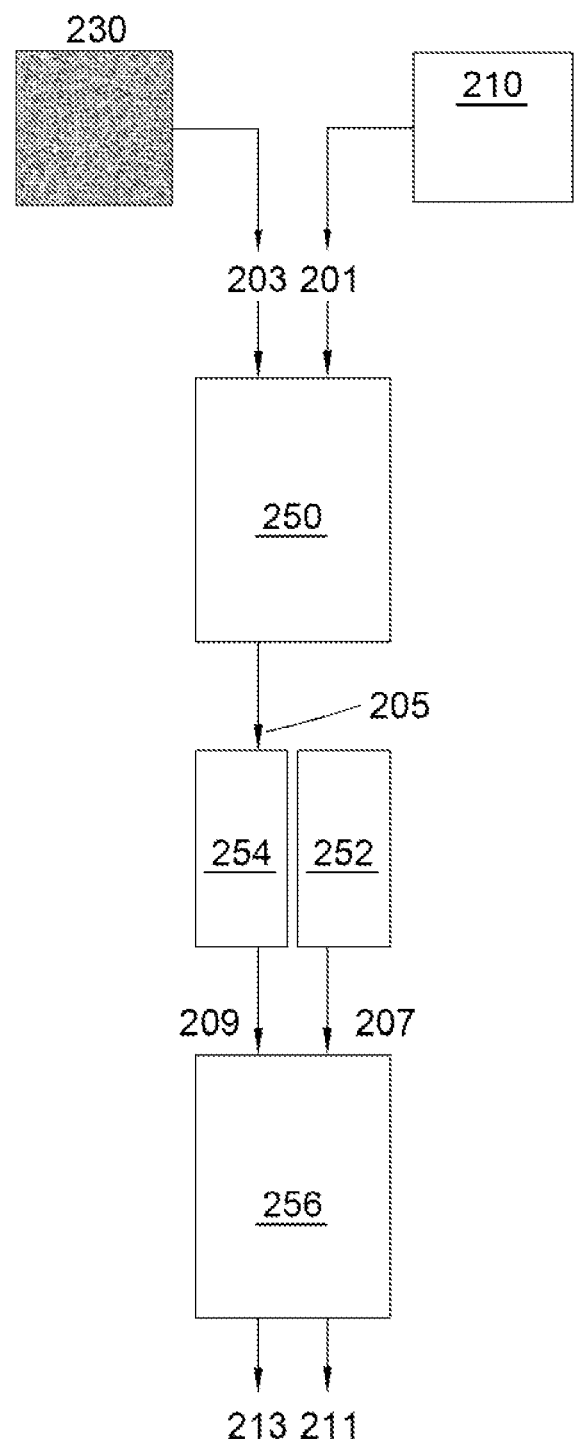
FIG. 2A illustrates a first iteration of an example Gerchberg-Saxton type algorithm.
Figure 2B:
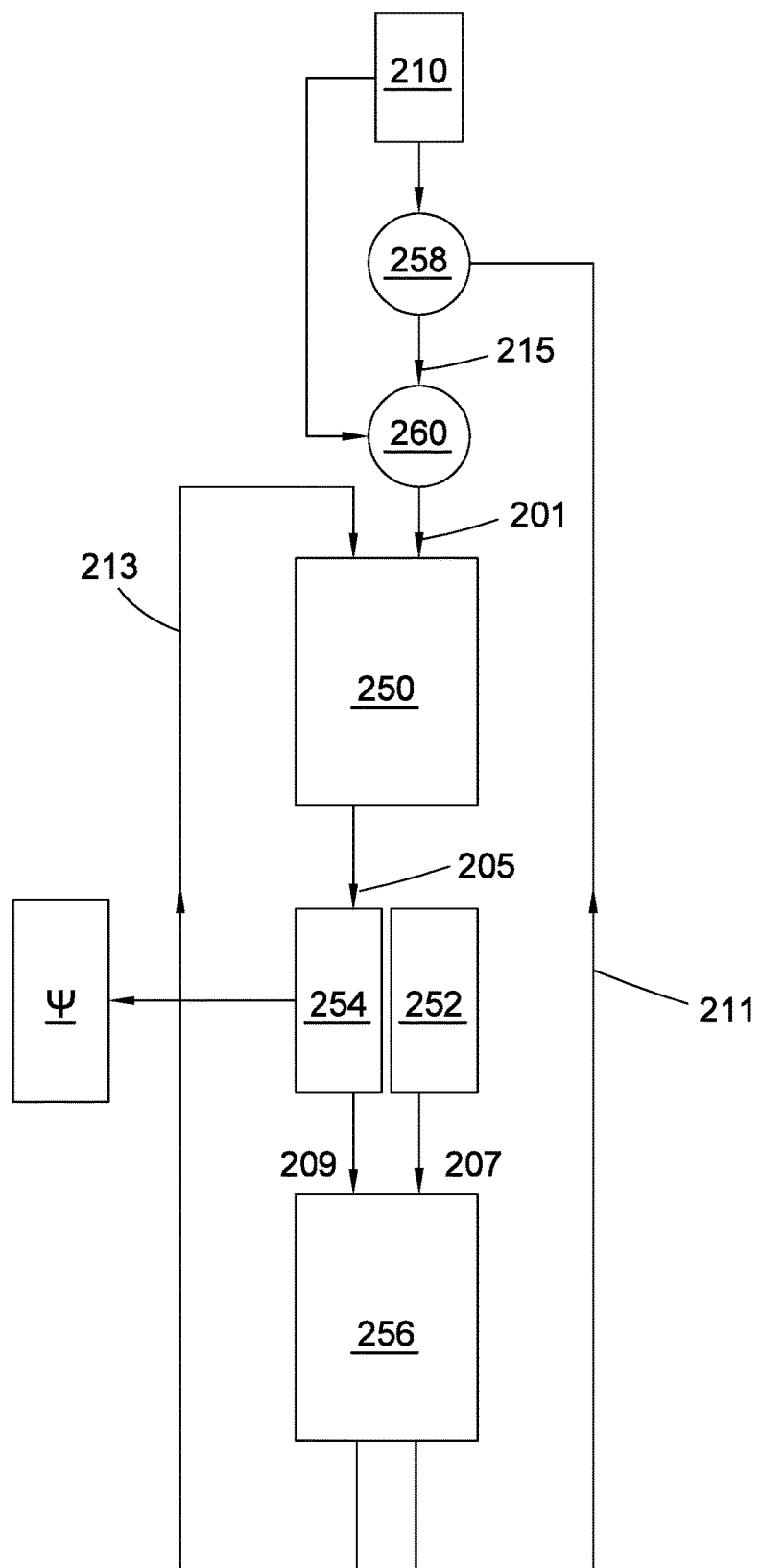
FIG. 2B illustrates the second and subsequent iterations of the example Gerchberg-Saxton type algorithm.

An example algorithm based on the Gerchberg-Saxton algorithm in accordance with some embodiments of the present disclosure is described in the following with reference to FIG. 2. The algorithm is iterative and convergent. The algorithm is arranged to produce a hologram representing an input image. The algorithm may be used to determine an amplitude-only hologram, a phase-only hologram or a fully complex hologram. Example disclosed herein relate to producing a phase-only hologram by way of example only. FIG. 2A illustrates the first iteration of the algorithm and represents the core of the algorithm. FIG. 2B illustrates subsequent iterations of the algorithm.

For the purpose of this description, the amplitude and phase information are considered separately although they are intrinsically combined to form a composite complex data set. With reference to FIG. 2A, the core of the algorithm can be considered as having an input comprising first complex data and an output comprising a fourth complex data. First complex data comprises a first amplitude component 201 and a first phase component 203. Fourth complex data comprises a fourth amplitude component 211 and a fourth phase component 213. In this example, the input image is two-dimensional. The amplitude and phase information are therefore functions of the spatial coordinates (x, y) in the farfield image and functions of (u, v) for the hologram field. That is, the amplitude and phase at each plane are amplitude and phase distributions at each plane.

In this first iteration, the first amplitude component 201 is the input image 210 of which the hologram is being calculated. In this first iteration, the first phase component 203 is a random phase component 230 merely used as a starting point for the algorithm. Processing block 250 performs a Fourier transform of the first complex data to form second complex data having a second amplitude component (not shown) and a second phase information 205. In this example, the second amplitude component is discarded and replaced by a third amplitude component 207 by processing block 252. In other examples, processing block 252 performs different functions to produce the third amplitude component 207. In this example, the third amplitude component 207 is a distribution representative of the light source. Second phase component 205 is quantised by processing block 254 to produce third phase component 209. The third amplitude component 207 and third phase component 209 form third complex data. The third complex data is input to processing block 256 which performs an inverse Fourier transform. Processing block 256 outputs fourth complex data having the fourth amplitude component 211 and the fourth phase component 213. The fourth complex data is used to form the input for the next iteration. That is, the fourth complex data of the nth iteration is used to form the first complex data set of the (n+1)th iteration.

FIG. 2B shows second and subsequent iterations of the algorithm. Processing block 250 receives first complex data having a first amplitude component 201 derived from the fourth amplitude component 211 of the previous iteration and a first phase component 213 corresponding to the fourth phase component of the previous iteration.

In this example, the first amplitude component 201 is derived from the fourth amplitude component 211 of the previous iteration as described in the following. Processing block 258 subtracts the input image 210 from the fourth amplitude component 211 of the previous iteration to form fifth amplitude component 215. Processing block 260 scales the fifth amplitude component 215 by a gain factor α and subtracts it from the input image 210. This is expressed mathematically by the following equations:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

Where:
F' is the inverse Fourier transform;
F if the forward Fourier transform;
R is the replay field;
T is the target image;
∠ is the angular information;
ψ is the quantized version of the angular information;
ε is the new target magnitude, ε≥0; and
α is a gain element ~1.

The gain element α may be fixed or variable. In examples, the gain element α is determined based on the size and rate of the incoming target image data.

Processing blocks 250, 252, 254 and 256 function as described with reference to FIG. 2A. In the final iteration, a phase-only hologram ψ(u, v) representative of the input image 210 is output. It may be said that the phase-only hologram ψ(u, v) comprises a phase distribution in the frequency or Fourier domain.

In other examples, the second amplitude component is not discarded. Instead, the input image 210 is subtracted from the second amplitude component and a multiple of that amplitude component is subtracted from the input image 210 to produce the third amplitude component 307. In other examples, the fourth phase component is not fed back in full and only a portion proportion to its change over, for example, the last two iterations is fed back.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

However, some embodiments relate to Fourier holography and Gerchberg-Saxton type algorithms by way of example only. The present disclosure is equally applicable to Fresnel holography and holograms calculated by other techniques such as those based on point cloud methods.

The present disclosure may be implemented using any one of a number of different types of SLM. The SLM may output spatially modulated light in reflection or transmission. In some embodiments, the SLM is a liquid crystal on silicon (LCOS) SLM but the present disclosure is not restricted to this type of SLM. In some embodiments, the spatial light modulator is a optically-activated spatial light modulator.

A LCOS device is capable of displaying large arrays of phase only elements in a small aperture. Small elements (typically approximately 10 microns or smaller) result in a practical diffraction angle (a few degrees) so that the optical system does not require a very long optical path. It is easier to adequately illuminate the small aperture (a few square centimetres) of a LCOS SLM than it would be for the aperture of a larger liquid crystal device. LCOS SLMs also have a large aperture ratio, there being very little dead space between the pixels (as the circuitry to drive them is buried under the mirrors). This is an important issue to lowering the optical noise in the replay field. Using a silicon backplane has the advantage that the pixels are optically flat, which is important for a phase modulating device.

Figure 3:
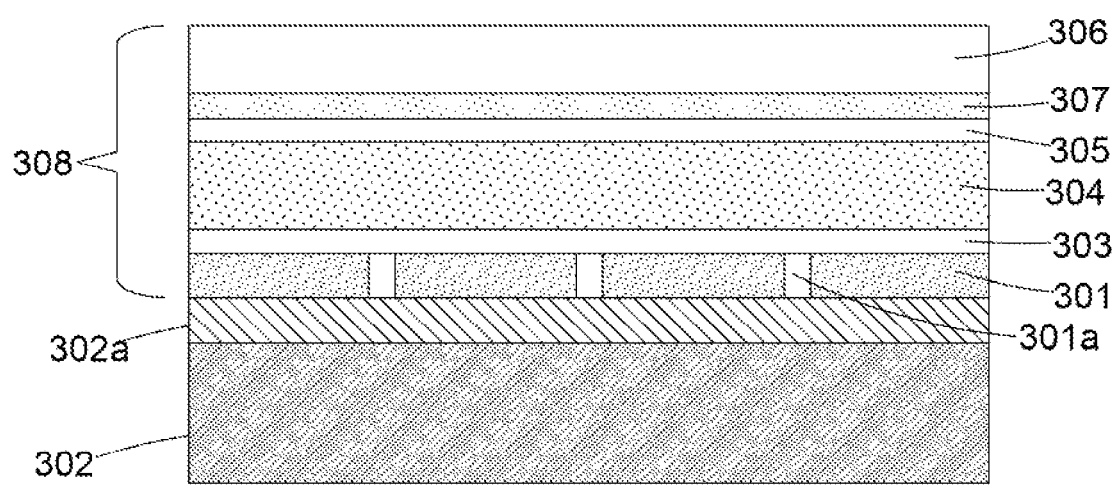
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the liquid crystal layer 304 and a planar transparent layer 306, e.g. of glass, is disposed on the second alignment layer 305. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection but the present disclosure is equally applicable to a transmissive device. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images).

The size of the holographic replay field (i.e. the physical or spatial extent of the holographic reconstruction) is determined by the interaction of light wavelengths on the pixel pitch of the spatial light modulator (i.e. the distance between adjacent light-modulating elements, or pixels, of the spatial light modulator). The smallest feature which may be formed in the replay field may be called a "resolution element", "image spot" or an "image pixel". The Fourier transform of a quadrangular aperture is a sinc function and therefore the spatial light modulator aperture defines each image pixel as a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e. the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels. It is desirable to have small image pixels and a high resolution (density) of image pixels in the replay field.

Figure 4:
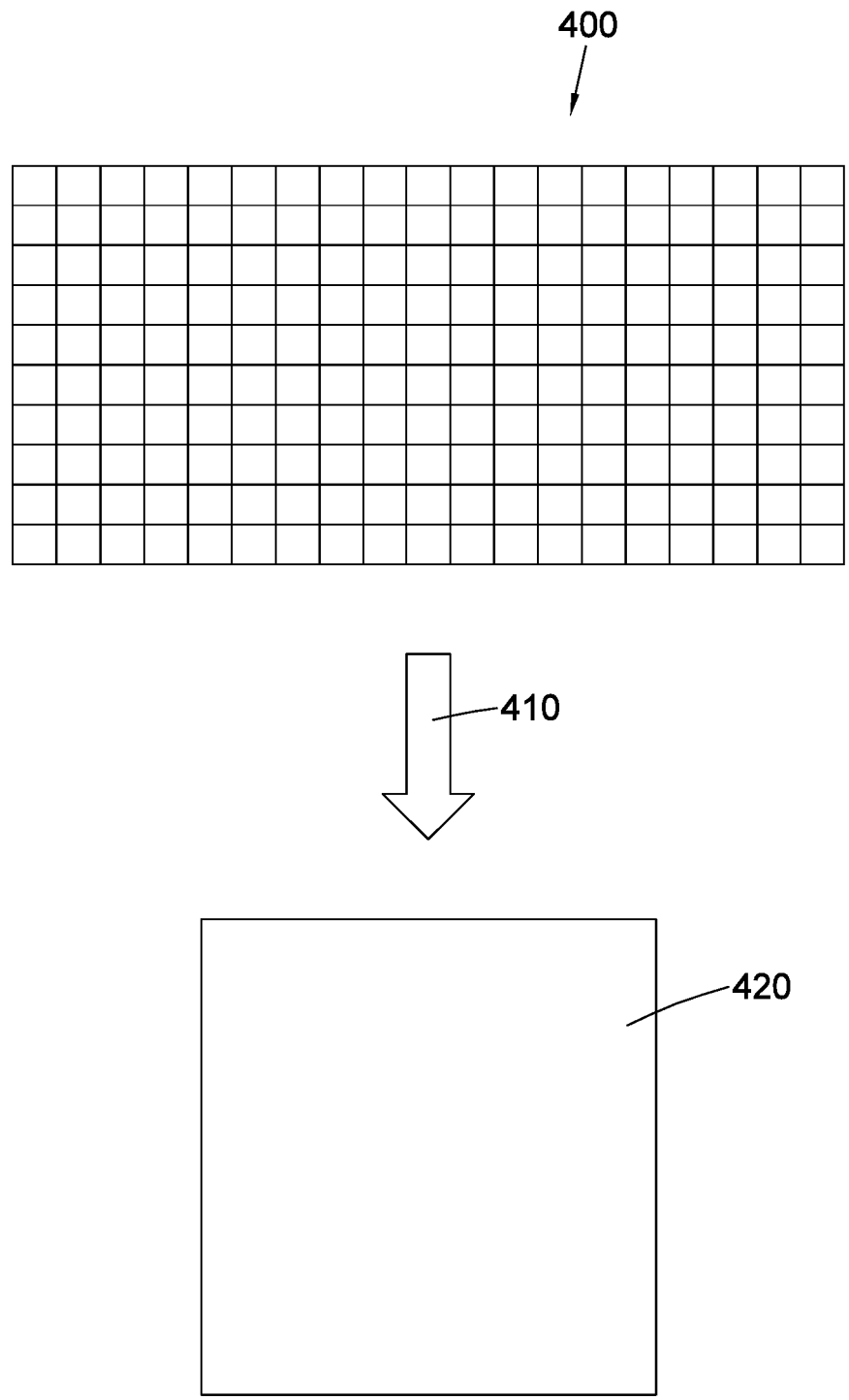
FIG. 4 shows rectangular array of square pixels and a square replay field.

FIG. 4 shows a rectangular array 400 of square pixels. If a computer-generated hologram is displayed on the rectangular array 400 of pixels and reconstructed 410 by illumination with suitable light, the holographic replay field 420 is square. This is because the size and shape of each pixel determines the size and shape of the replay field. In an example, the computer-generated hologram comprises 1024×512 pixels and the holographic reconstruction comprises 1024×512 image pixels. These image pixels are evenly distributed in the square replay field 420. Effectively, the vertical resolution is half the horizontal resolution.

In many situations, it is desirable to have a rectangular replay field such as a widescreen replay field. For example, it may be desirable to have a replay field with an aspect ratio of 16:9 or 2:1. Conventionally, this is achieved by calculating a computer-generated hologram which only directs light to a rectangular sub-area of the replay field.

Figure 5:
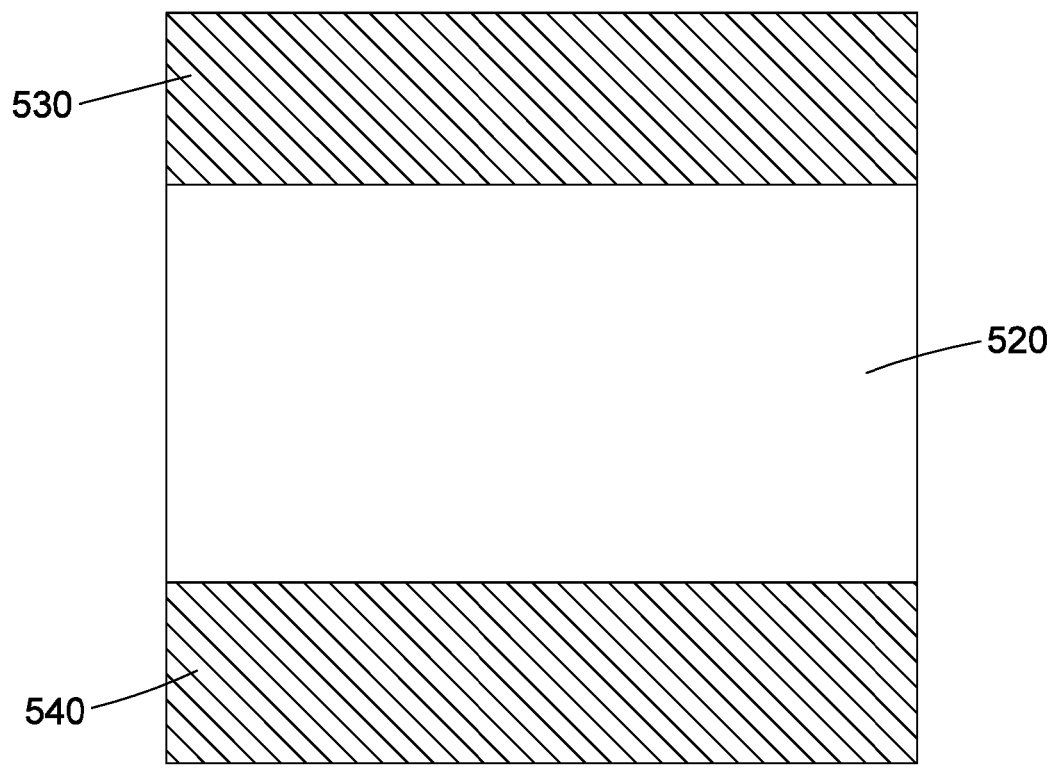
FIG. 5 illustrates an approach to providing a rectangular image space by having inactive areas of a square replay field.

FIG. 5 shows a first sub-area 520 of a square holographic replay field which is used to display a holographic reconstruction comprising image content. FIG. 5 also shows a second sub-region 530 and third sub-region 540 that are not used to display image content. The image pixels in the second sub-area 530 and third sub-area 540 are effectively unused. The full potential of this holographic projection is not therefore realised. Additionally, in some examples, baffling or light shields may be included to obscure the second sub-area 530 and third sub-area 540 from the viewer.

Figure 6:
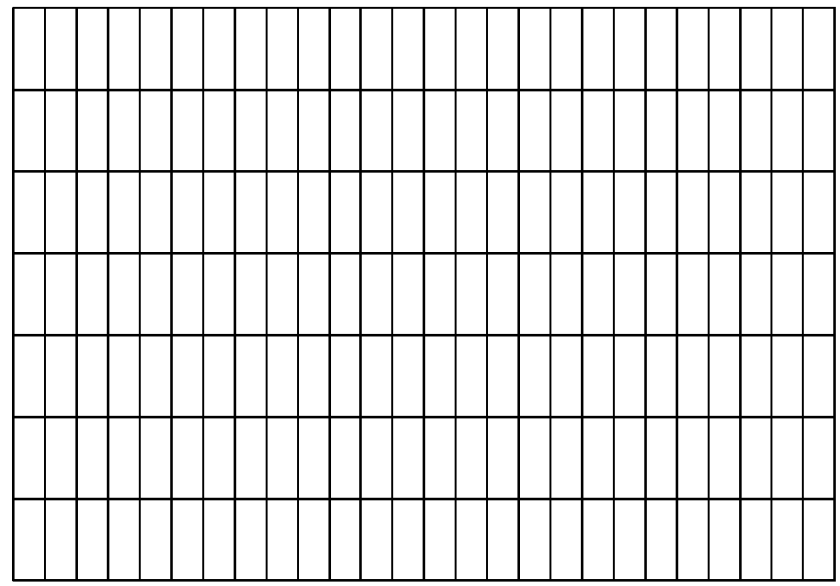
FIG. 6 shows a rectangular array of rectangular pixels in accordance with embodiments.
Figure 6:
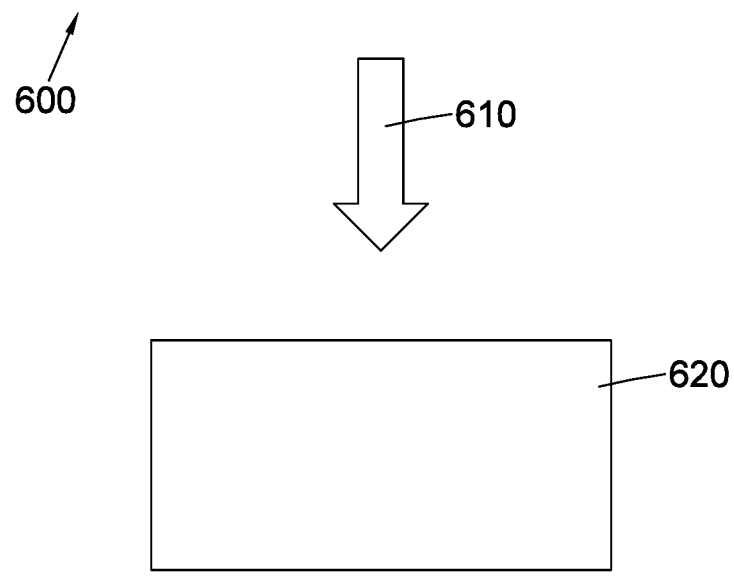

FIG. 6 shows an embodiment comprising a rectangular array 600 of rectangular pixels. If a computer-generated hologram is displayed on the rectangular array 600 of pixels and reconstructed 610 by illumination with suitable light, the holographic replay field 620 is rectangular. The inventors have recognised that if the shape of smallest feature in the hologram plane (i.e. one pixel of the spatial light modulator) is matched to the shape of the desired display area (i.e. the shape of the replay field) then the resolution (density) of image pixels in the replay field is maximised. Specifically, it is found that the aspect ratio of the smallest feature in the hologram plane is substantially the inverse as the aspect ratio of the largest feature in the replay field (i.e. the physical or spatial extent of the replay field itself).

In some embodiments, the short side of each rectangular pixel is 0.5 to 5 micrometres, optionally 1 to 3 microns and the long side is 2 to 12 micrometres, optionally 4 to 8 microns. In some embodiments, the aspect ratio of the pixels is within the range 1:1.2 to 1:3, optionally 1:1.5 to 1:2.5, further optionally 1:2.

Figure 7:
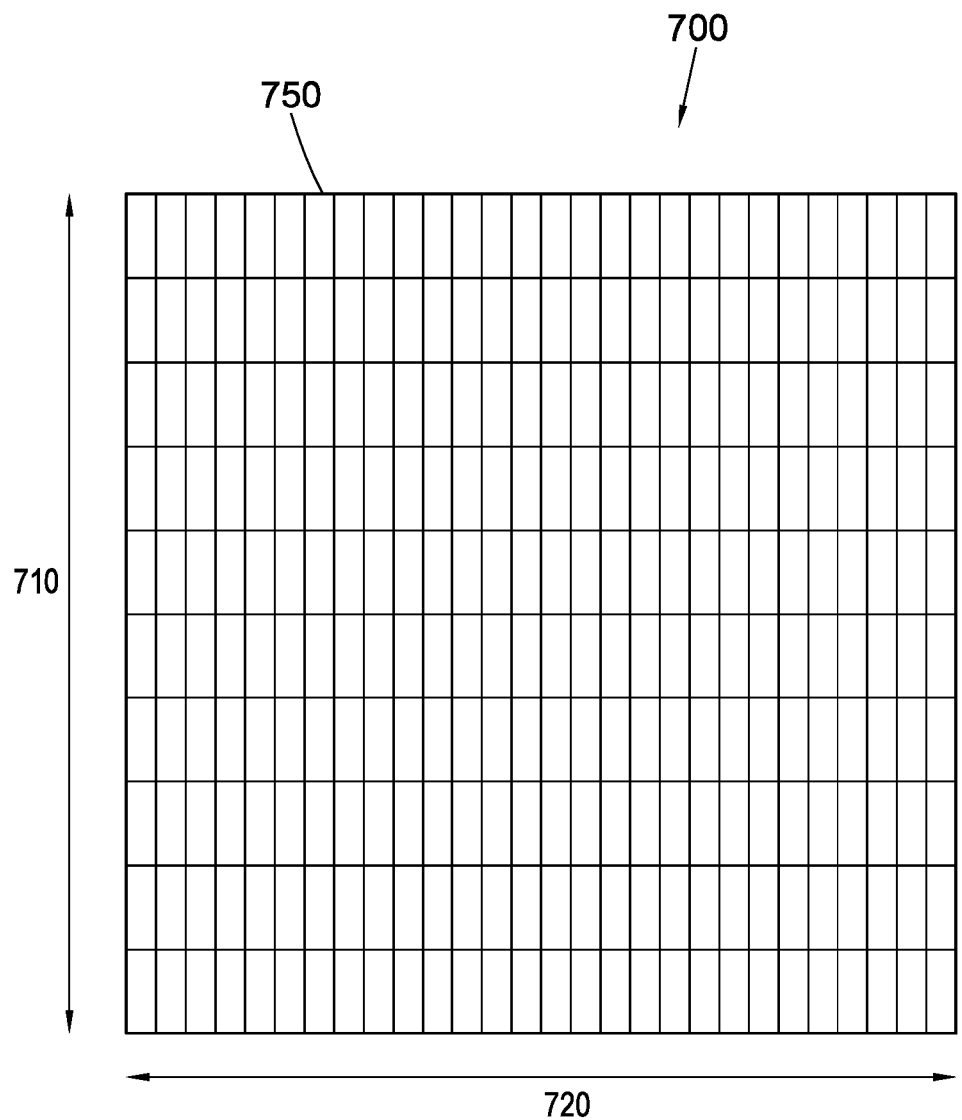
FIG. 7 shows a square array of rectangular pixels accordance with embodiment.

FIG. 7 shows a further advantageous embodiment in which the pixels are rectangular but the array is square. Specifically, FIG. 7 shows a plurality of pixels 700 and an array of pixels within a square aperture 750. The size and shape of the largest feature in the hologram plane (i.e. aperture 750) defines the size and shape of the smallest feature in the replay field. A square aperture gives rise to image spots having at least two axes of symmetry which is good for image quality. In an embodiment, each pixel is rectangular but the array of pixels is square—that is, the array of pixels are contained, or defined, within a square aperture.

Figure 8:
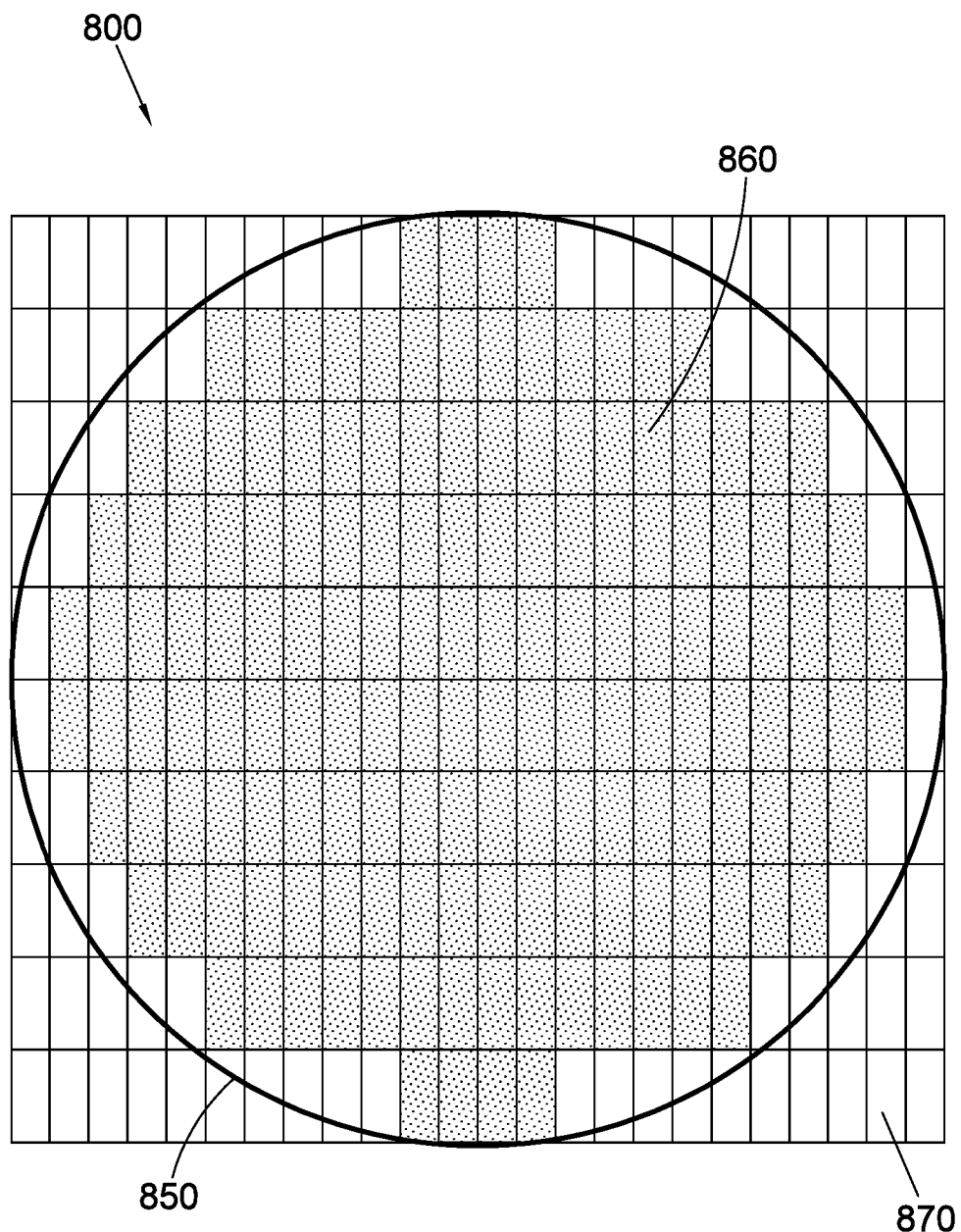
FIG. 8 shows a circular array of rectangular pixels in accordance with further embodiments.

FIG. 8 shows a yet further advantageous embodiment in which the pixels are rectangular but the array is circular. Specifically, FIG. 8 shows a plurality of pixels 800 and an array of pixels within a circular aperture 850. A circle aperture gives rise to an image spot which is radially symmetric and therefore further improves image quality. In an embodiment, each pixel is rectangular but the array of pixels is circular—that is, the array of pixels are contained, or defined, within a circular aperture. In an embodiment, the spatial light modulator may comprise a quadrangular array of pixels but only a subset of the pixels—including, for example, pixel 860 but excluding pixel 870—is used to define the circular array of pixels used for displaying/representing the computer-generated hologram. For the avoidance of any doubt, FIG. 8 shows the layout of hologram pixels not, for example, the die per wafer.

In embodiments, the pixels comprise liquid crystal, such as nematic liquid crystal, and the directors of the liquid crystal are aligned with the longest side of the pixel. That is, the directors of the liquid crystals are substantially parallel to the longest side of the pixel. The skilled person will be familiar with processes—such as rubbing a liquid crystal alignment layer and directional evaporation of a liquid crystal alignment layer—in order to align the liquid crystal directors and a detailed description is not therefore required here. In some embodiments, the liquid crystal is a twisted nematic liquid crystal. In some embodiments, the liquid crystals are operated in vertical alignment nematic, "VAN", mode.

In some embodiments, the light source is a laser. In some embodiments, there is provided a light receiving surface which may be a screen or a diffuser. The holographic projection system of the present disclosure may be used as a 3D display or projector. The holographic projection system of the present disclosure may also be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on.

An advantage of FSC method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496, 108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projection system arranged to project light to a rectangular replay field having an aspect ratio, wherein the holographic projection system comprises:
 a spatial light modulator, comprising an array of individually addressable pixels, arranged to receive a computer-generated hologram and output spatially-modulated light forming a holographic reconstruction at the rectangular replay field, wherein each pixel is a rectangular pixel having an aspect ratio;
 a light source arranged to illuminate the plurality of pixels to form the spatially-modulated light forming a holographic reconstruction at the replay field, wherein the holographic reconstruction comprises image content arranged to be viewed by a human viewer of the holographic projection system,
 wherein the rectangular replay field is spatially separated from the spatial light modulator and wherein the aspect ratio of each pixel is matched to the desired aspect ratio of the replay field such that the aspect ratio of the rectangular replay field is substantially equal to the aspect ratio of each pixel but with the rectangular replay field and each pixel orthogonally orientated with respect to each other.

2. A holographic projection system as claimed in claim 1 wherein the holographic reconstruction is formed by interference of the spatially-modulated light at the replay field.

3. A holographic projection system as claimed in claim 1 wherein the spatially-modulated light is diffracted by the pixels of the spatial light modulator.

4. A holographic projector as claimed in claim 1 wherein the aspect ratio of each pixel is greater than 1:1.2 and less than 1:3.

5. A holographic projection system as claimed in claim 1 wherein the pixel pitch in the one direction of the array is greater than the pixel pitch in the other direction of the array.

6. A holographic projection system as claimed in claim 1 wherein the array of pixels forms a substantially square array of rectangular pixels or a substantially circular array of rectangular pixels.

7. A holographic projection system as claimed in claim 1 wherein each pixel comprises a liquid crystal having a director.

8. A holographic projection system as claimed in claim 7, wherein the liquid crystal is a nematic liquid crystal.

9. A holographic projection system as claimed in claim 1 wherein the computer-generated hologram is a mathematical transformation of the holographic reconstruction.

10. A holographic projection system as claimed in claim 9 wherein:
the mathematical transformation is a Fourier transform or a Fresnel transform, or
the computer-generated hologram is a hologram generated by a point cloud method.

11. A holographic projection system as claimed in claim 1 wherein:
each pixel is a light-modulating element, and/or
each pixel comprises a phase-modulating element.

12. A holographic projection system as claimed in claim 1 wherein the pixels of the array of pixels are substantially parallel to each other.

13. A holographic projection system as claimed in claim 1 wherein spatial light modulator is a liquid crystal on silicon spatial light modulator.

14. A holographic projection system as claimed in claim 1 wherein:
the light source is a monochromatic light source, and/or
the light source is arranged to emit at least partially coherent light.

15. A holographic projection system as claimed in claim 1 wherein the holographic reconstruction is formed on a light-receiving surface at the replay field.

16. A holographic projection system as claimed in claim 15, wherein the light-receiving surface is a screen or diffuser.

17. A method of forming a holographic reconstruction in a holographic replay field having a rectangular shape with an aspect ratio, the method comprising:
receiving a computer-generated hologram;
representing the computer-generated hologram on a spatial light modulator comprising a plurality of individually addressable pixels, wherein the pixels are rectangular pixels having an aspect ratio;
spatially-modulating light in accordance with the computer-generated hologram using the spatial light modulator;
forming a holographic reconstruction at the holographic replay field, wherein the holographic replay field is spatially separated from the spatial light modulator and wherein the aspect ratio of each pixel is matched to the desired aspect ratio of the replay field such that the aspect ratio of the holographic replay field is substantially equal to the aspect ratio of each pixel but with the replay field and each pixel orthogonally orientated with respect to each other, and wherein the holographic reconstruction comprises image content arranged to be viewed by a human viewer.

18. A holographic projection system arranged to project light to a rectangular replay field having an aspect ratio, wherein the holographic projection system comprises:
a spatial light modulator, comprising an array of individually addressable pixels, arranged to receive a computer-generated hologram and output spatially-modulated light forming a holographic reconstruction at the rectangular replay field, wherein each pixel is a rectangular pixel having an aspect ratio;
a light source arranged to illuminate the plurality of pixels to form the spatially-modulated light forming a holographic reconstruction at the replay field, wherein the holographic reconstruction comprises image content arranged to be viewed by a human viewer of the holographic projection system,
wherein the rectangular replay field is spatially separated from the spatial light modulator and wherein the aspect ratio of each pixel is matched to the desired aspect ratio of the replay field such that the aspect ratio of the rectangular replay field is substantially equal to the aspect ratio of each pixel but with the rectangular replay field and each pixel orthogonally orientated with respect to each other,
wherein each pixel comprises a liquid crystal having a director substantially parallel to the longer side of the rectangular pixels.

19. A holographic projection system as claimed in claim 18, wherein the liquid crystal is a nematic liquid crystal.

* * * * *